(12) United States Patent
Lin (10) Patent No.: US 7,800,997 B2
(45) Date of Patent: Sep. 21, 2010

(54) METHOD AND APPARATUS FOR GENERATING FREQUENCY-MULTIPLIED FREQUENCY GENERATOR SIGNAL USED IN OPTICAL DRIVE

(75) Inventor: Chen Nan Lin, Hsinchu (TW)

(73) Assignee: Sunext Technology Co., Ltd., Hsinchu (TW)

( * ) Notice: Subject to any disclaimer, the term of this patent is extended or adjusted under 35 U.S.C. 154(b) by 421 days.

(21) Appl. No.: 12/022,828

(22) Filed: Jan. 30, 2008

(65) Prior Publication Data

US 2008/0192593 A1 Aug. 14, 2008

(30) Foreign Application Priority Data

Feb. 13, 2007 (TW) .............................. 96105343 A (51) Int. Cl.
*G11B 7/00* (2006.01)
(52) U.S. Cl. ................. 369/47.39; 369/47.38; 369/47.4
(58) Field of Classification Search ........................ None
See application file for complete search history.

(56) References Cited

U.S. PATENT DOCUMENTS

| | | | |
|---|---|---|---|
| 5,910,651 A * | 6/1999 | Ryvkin .................. | 235/462.25 |
| 6,442,115 B1 * | 8/2002 | Shimoda et al. .......... | 369/47.28 |
| 6,940,792 B1 * | 9/2005 | Watanabe ................ | 369/47.38 |
| 7,200,082 B2 * | 4/2007 | Masaaki et al. .......... | 369/47.38 |
| 2003/0202221 A1 * | 10/2003 | Motoi et al. ................ | 358/474 |

* cited by examiner

*Primary Examiner*—Joseph Haley
(74) *Attorney, Agent, or Firm*—WPAT, PC; Justin King (57) ABSTRACT

An optical drive servo control system comprises: an optical pickup, for accessing an optical disc and generating an optical signal; a spindle motor, for rotating the optical disc and outputting a FG signal and a spindle motor synchronous signal; a frequency-multiplied FG signal generator, for generating an actual frequency-multiplied FG signal after receiving the FG signal, the spindle motor synchronous signal, a reference clock signal, and a frequency-multiplier value; and, a servo control unit, for controlling the spindle motor and the optical pickup, and compensating a run-out error of the optical disc according to the actual frequency-multiplied FG signal; wherein the frequency-multiplied FG signal generator calculates an ideal frequency-multiplied FG signal according to the reference clock signal and the frequency-multiplier value, and a positioning error between the ideal frequency-multiplied FG signal and the actual frequency-multiplied FG signal is less than half of a period of the reference clock signal.

6 Claims, 10 Drawing Sheets

| | pulse 0 | pulse 1 | pulse 2 | pulse 3 | pulse 4 | pulse 5 | pulse 6 | pulse 7 | pulse 8 |
|---|---|---|---|---|---|---|---|---|---|
| period of actual frequency-multiplied FG signal | $3t$ | $3t$ | $3t$ | $3t$ | $2t$ | $2t$ | $2t$ | $2t$ | $2t$ |
| period of ideal frequency-multiplied FG signal | $2\frac{4}{9}t$ | $2\frac{4}{9}t$ | $2\frac{4}{9}t$ | $2\frac{4}{9}t$ | $2\frac{4}{9}t$ | $2\frac{4}{9}t$ | $2\frac{4}{9}t$ | $2\frac{4}{9}t$ | $2\frac{4}{9}t$ |
| triggering time point of actual frequency-multiplied FG signal | $3t$ | $6t$ | $9t$ | $12t$ | $14t$ | $16t$ | $18t$ | $20t$ | $22t$ |
| triggering time point of ideal frequency-multiplied FG signal | $2\frac{4}{9}t$ | $4\frac{8}{9}t$ | $7\frac{3}{9}t$ | $9\frac{7}{9}t$ | $12\frac{2}{9}t$ | $14\frac{6}{9}t$ | $17\frac{1}{9}t$ | $19\frac{5}{9}t$ | $22t$ |
| positioning error | $\frac{5}{9}t$ | $1\frac{1}{9}t$ | $1\frac{6}{9}t$ | $2\frac{2}{9}t$ | $1\frac{7}{9}t$ | $1\frac{3}{9}t$ | $\frac{8}{9}t$ | $\frac{4}{9}t$ | $0$ |

FIG.6
PRIOR ART

| | pulse 0 | pulse 1 | pulse 2 | pulse 3 | pulse 4 | pulse 5 | pulse 6 | pulse 7 | pulse 8 |
|---|---|---|---|---|---|---|---|---|---|
| triggering time point of actual frequency-multiplied FG signal | 2t | 5t | 7t | 10t | 12t | 15t | 17t | 20t | 22t |
| triggering time point of ideal frequency-multiplied FG signal | $2\frac{4}{9}t$ | $4\frac{8}{9}t$ | $7\frac{3}{9}t$ | $9\frac{7}{9}t$ | $12\frac{2}{9}t$ | $14\frac{6}{9}t$ | $17\frac{1}{9}t$ | $19\frac{5}{9}t$ | 22t |
| positioning error | $\frac{4}{9}t$ | $\frac{1}{9}t$ | $\frac{3}{9}t$ | $\frac{3}{9}t$ | $\frac{2}{9}t$ | $\frac{3}{9}t$ | $\frac{1}{9}t$ | $\frac{4}{9}t$ | 0 |

FIG.7B

| | pulse 0 (n=0) | pulse 1 (n=1) | pulse 2 (n=2) | pulse 3 (n=3) | pulse 4 (n=4) | pulse 5 (n=5) | pulse 6 (n=6) | pulse 7 (n=7) | pulse 8 (n=8) |
|---|---|---|---|---|---|---|---|---|---|
| period of ideal frequency-multiplied FG signal | $2\frac{4}{9}t$ | $2\frac{4}{9}t$ | $2\frac{4}{9}t$ | $2\frac{4}{9}t$ | $2\frac{4}{9}t$ | $2\frac{4}{9}t$ | $2\frac{4}{9}t$ | $2\frac{4}{9}t$ | $2\frac{4}{9}t$ |
| triggering time point of ideal frequency-multiplied FG signal | $2\frac{4}{9}t$ | $4\frac{8}{9}t$ | $7\frac{3}{9}t$ | $9\frac{7}{9}t$ | $12\frac{2}{9}t$ | $14\frac{6}{9}t$ | $17\frac{1}{9}t$ | $19\frac{5}{9}t$ | $22t$ |
| Rn | 4 | 8 | 3 | 7 | 2 | 6 | 1 | 5 | 0 |
| Pn | 0 | 1 | 0 | 1 | 0 | 1 | 0 | 1 | 0 |
| period of actual frequency-multiplied FG signal | $2t$ | $3t$ | $2t$ | $3t$ | $2t$ | $3t$ | $2t$ | $3t$ | $2t$ |
| triggering time point of actual frequency-multiplied FG signal | $2t$ | $5t$ | $7t$ | $10t$ | $12t$ | $15t$ | $17t$ | $20t$ | $22t$ |
| positioning error | $\frac{4}{9}t$ | $\frac{1}{9}t$ | $\frac{3}{9}t$ | $\frac{3}{9}t$ | $\frac{2}{9}t$ | $\frac{3}{9}t$ | $\frac{1}{9}t$ | $\frac{4}{9}t$ | 0 |
| positioning error in FIG.5C | $\frac{5}{9}t$ | $1\frac{1}{9}t$ | $1\frac{6}{9}t$ | $2\frac{2}{9}t$ | $1\frac{7}{9}t$ | $1\frac{3}{9}t$ | $\frac{8}{9}t$ | $\frac{4}{9}t$ | 0 |

METHOD AND APPARATUS FOR GENERATING FREQUENCY-MULTIPLIED FREQUENCY GENERATOR SIGNAL USED IN OPTICAL DRIVE

FIELD OF THE INVENTION

The present invention relates to a method and an apparatus for generating a frequency-multiplied frequency generator (FG) signal, and more particularly to a method and an apparatus for generating a frequency-multiplied FG signal used in a servo control system of an optical drive.

BACKGROUND OF THE INVENTION

Figure 1:
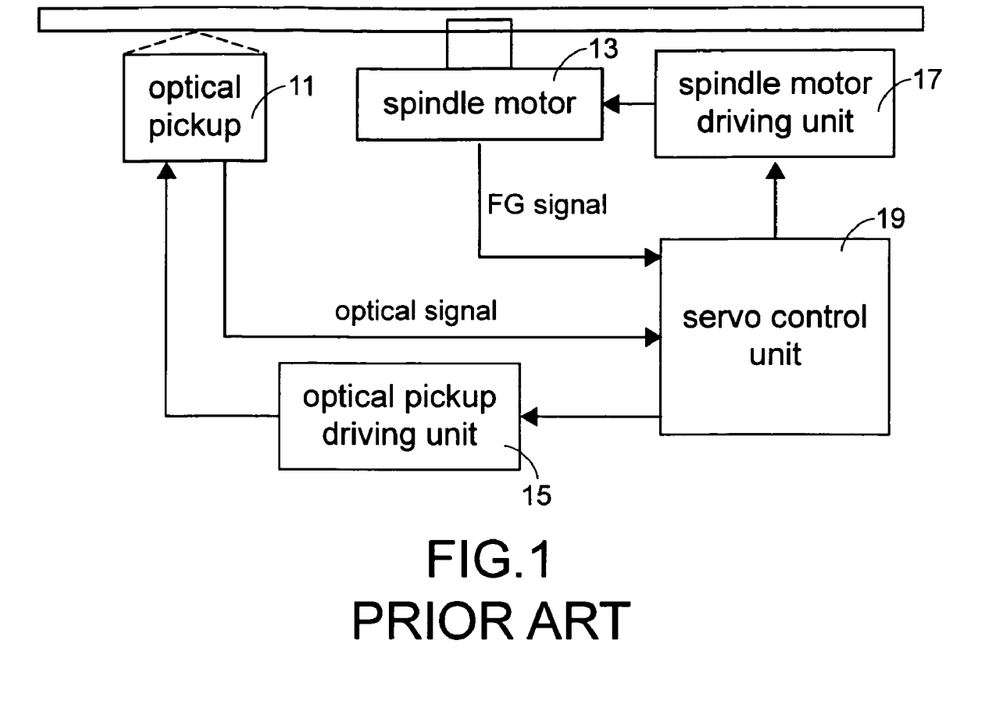
FIG. 1 is a block diagram of a conventional servo control system in an optical drive.

FIG. 1 is a block diagram of a conventional servo control system of an optical drive. The servo control system comprises an optical pickup 11, a spindle motor 13, an optical pickup driving unit 15, a spindle motor driving unit 17, and a servo control unit 19.

Firstly, according to an optical signal derived from the optical pickup 11, the servo control unit 19 can control the optical pickup 11 to process a focusing, a track jumping, a tracking on, or a track following actions by using the optical pickup driving unit 15. Moreover, the servo control unit 19 can also control the spindle motor 13 by using the spindle motor driving unit 17. The spindle motor 13 can derive a frequency generator signal (FG signal) to the servo control unit 19 according to the rotating speed of itself. After the FG signal is received by the servo control unit 19, the rotating speed of the spindle motor 13 is detected, and the servo control unit 19 can further control the rotating speed of the spindle motor 13 by using the spindle motor driving unit 17.

Figure 2:
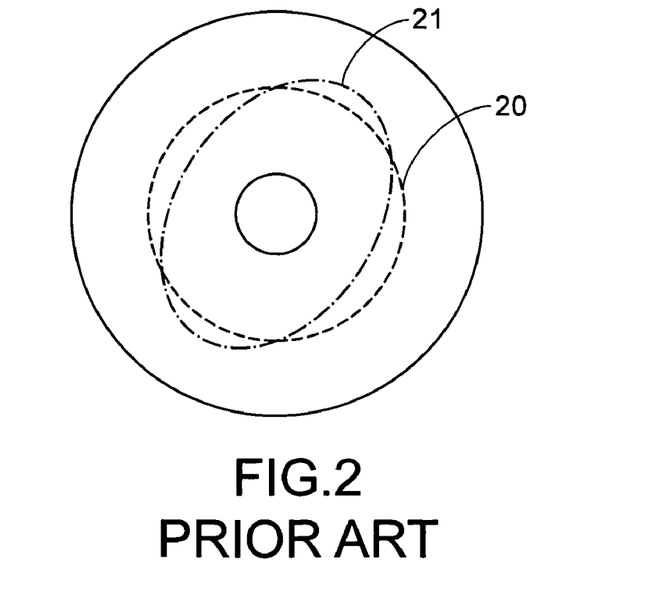
FIG. 2 is a diagram showing an ideal optical disc track and an actual optical disc track on an optical disc.

FIG. 2 is a diagram showing an ideal optical disc track and an actual optical disc track on an optical disc. In FIG. 2, the circle track 20 stands for an ideal optical disc track, and the elliptic track 21 stands for an actual optical disc track due to the deviation of disc manufacturing procedure, wherein the difference between the ideal optical disc track 20 and the actual optical disc track 21 is defined as a run-out error. For making the optical pickup 11 capable of precisely processing the tracking on or the tracking following, the run-out error must be accurately measured and compensated by the optical servo control system. In another words, after the optical disc is loaded into the optical drive but before the optical disc is accessed, the run-out error must be accurately measured by the optical servo control system, therefore, the servo control unit 19 can provide a specific offset to the optical pickup 11 for compensating the run-out error. Because the proper offset is continuously adjusted and then is provided to the optical pickup 11 during the data reading or data writing process of the optical drive, the tracking on and tracking following can be precisely processed no matter the optical drive is processed at a higher or a lower CAV (constant angular velocity).

Figure 3A:
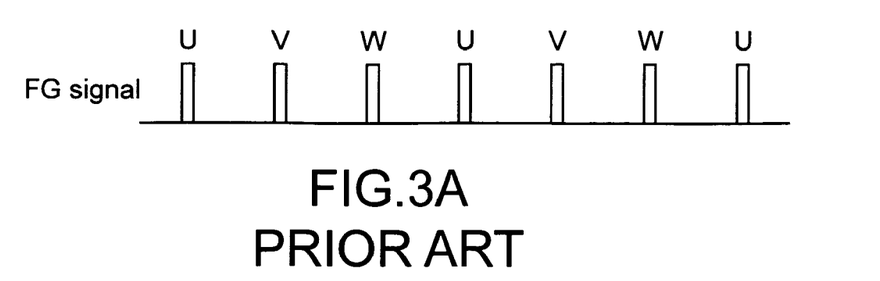
FIG. 3A is a diagram showing a FG signal derived from the spindle motor.
Figure 3B:
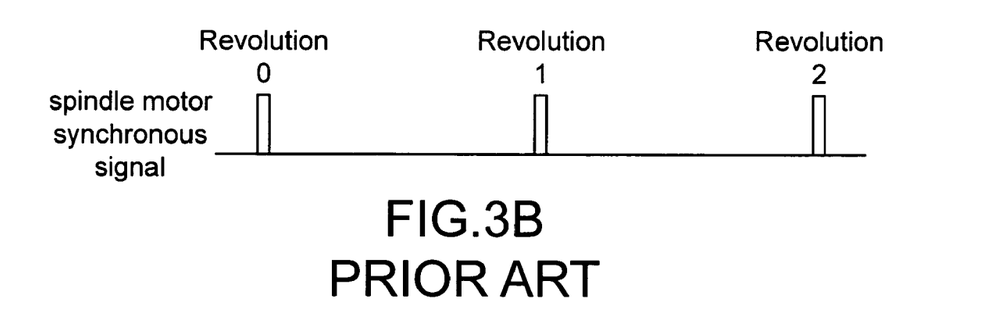
FIG. 3B is a diagram showing a spindle motor synchronous signal.
Figure 3C:
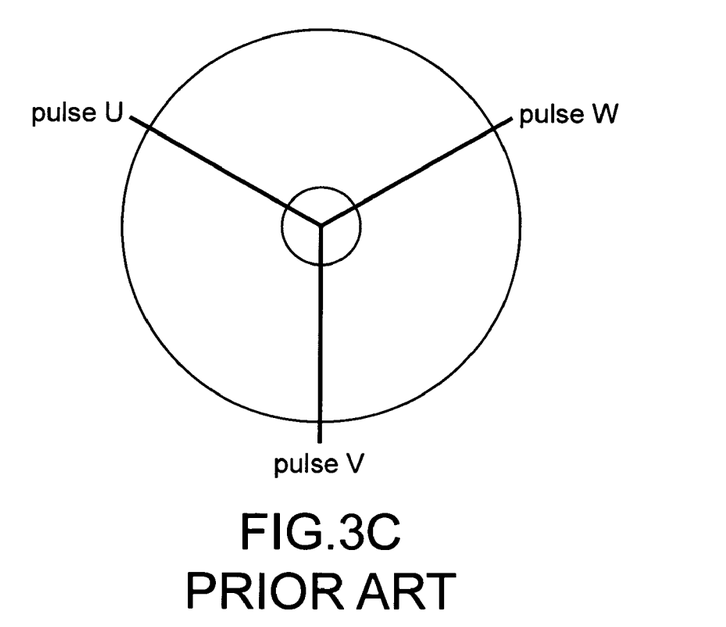
FIG. 3C is a diagram showing the relationship between the fixed positions of the optical disc and the FG signal.

For example, three Hall sensors (U, V, W) are implemented in the spindle motor 13 and Hall sensors are mounted around the spindle motor 120 from each other. A FG signal as depicted in FIG. 3A is resulted in when the three Hall sensors (U, V, W) are sensing the rotating position of the optical disc while the spindle motor 13 is rotating. And then, the FG signal is generated for the servo control unit 19 to executing a position learning procedure on the optical disc. In another words, there will be three pulses (pulse U, V, and W) occurred in the FG signal after the spindle motor 13 rotates one revolution. Moreover, a circuit implemented in the spindle motor 13 can also generate a spindle motor synchronous signal according to the FG signal. As depicted in FIG. 3B, there are three revolutions (revolution 0, 1, and 2) occurred in the spindle motor synchronous signal which is corresponding to the FG signal depicted in FIG. 3A. FIG. 3C is a diagram showing the relationship between 3 fixed positions on the optical disc and the U, V, W pulses of FG signal. The servo control unit 19 can use the three pulses occurred in the FG signal to excuse the position learning procedure of the optical disc. In another words, the three pulses occurred in the FG signal can determine three fixed positions on the optical disc.

Figure 4A:
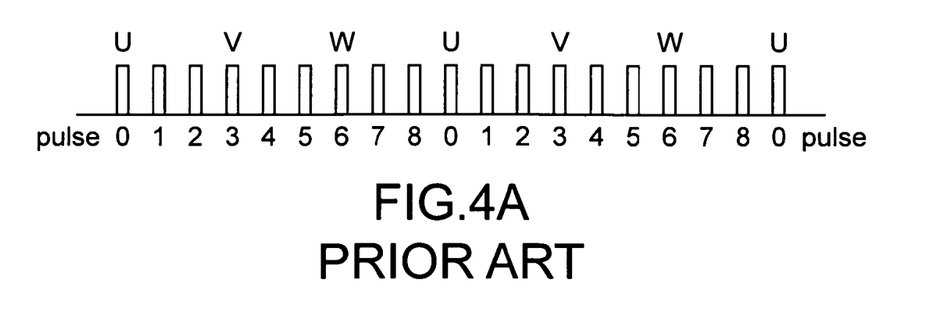
FIG. 4A is a diagram showing a frequency-multiplied FG signal having a frequency-multiplier value equal to 3.
Figure 4B:
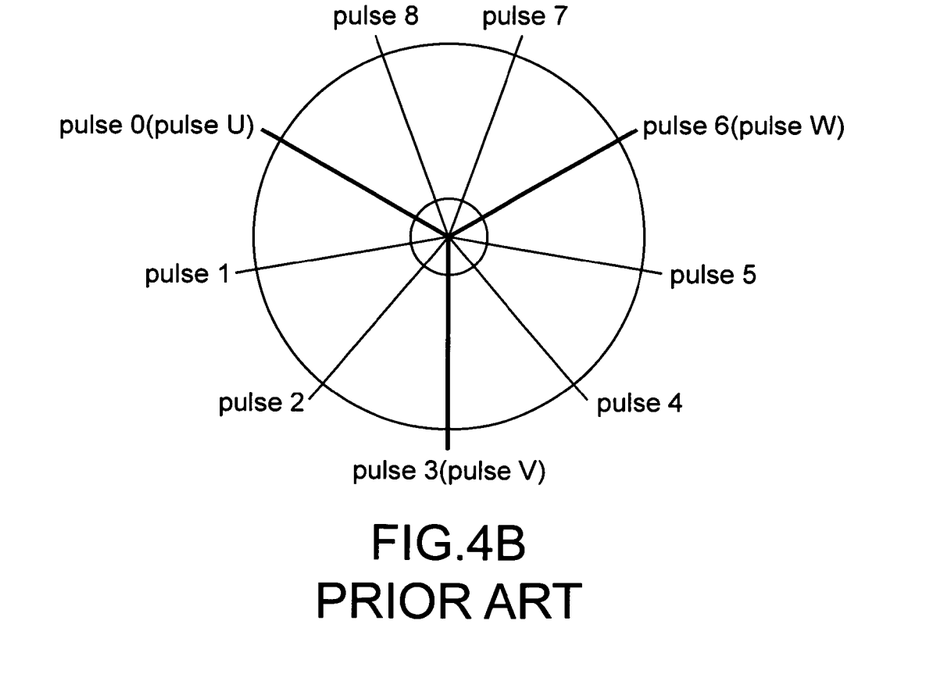
FIG. 4B is a diagram showing the relationship between the fixed positions of the optical disc and the frequency-multiplied FG signal.

Generally speaking, more fixed positions on the optical disc can make the optical disc more precisely controlled. Thus, the conventional optical disc servo control system multiplies the frequency of the FG signal by a frequency multiplier technique, and the frequency-multiplied FG signal includes more pulses in one revolution. In other words, the more pulses in one revolution the more fixed positions on the optical disc. Generally, the frequency ratio of the original FG signal to the frequency-multiplied FG signal (frequency-multiplier value) is set between 1~64 according to the specific requirements. FIG. 4A is a diagram showing a frequency-multiplied FG signal having a frequency-multiplier value equal to 3. As depicted in FIG. 4A, there are nine pulses (pulse 0, 1, 2, 3, 4, 5, 6, 7, and 8) occurred in the frequency-multiplied FG signal after the spindle motor 13 rotating one revolution. FIG. 4B is a diagram showing the relationship between the nine fixed positions and corresponding pulses on an optical disc. By receiving the frequency-multiplied FG signal, the servo control unit 19 can determine more fixed positions on the optical disc, and provides a proper offset to the optical pickup 11 for compensating the run-out error precisely.

For generating the frequency-multiplied FG signal, a high-frequency reference clock signal is necessarily involved, and to be compared with the FG signal. However, if the frequency ratio of the reference clock signal to the FG signal is not an integer, each pulse occurred in the frequency-multiplied FG signal may have different period, so as the optical drive may not able to precisely compensate the run-out error.

Figure 5A:
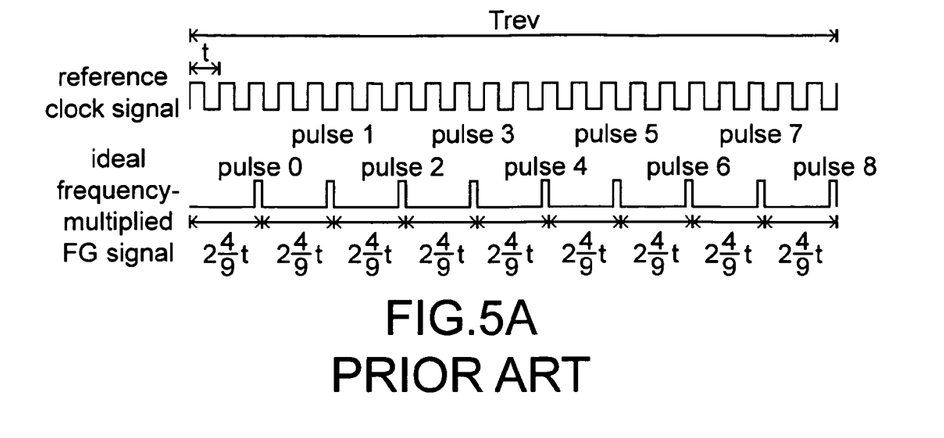
FIG. 5A is a diagram showing an ideal frequency-multiplied FG signal having a frequency-multiplier value equal to 3.
Figure 5B:
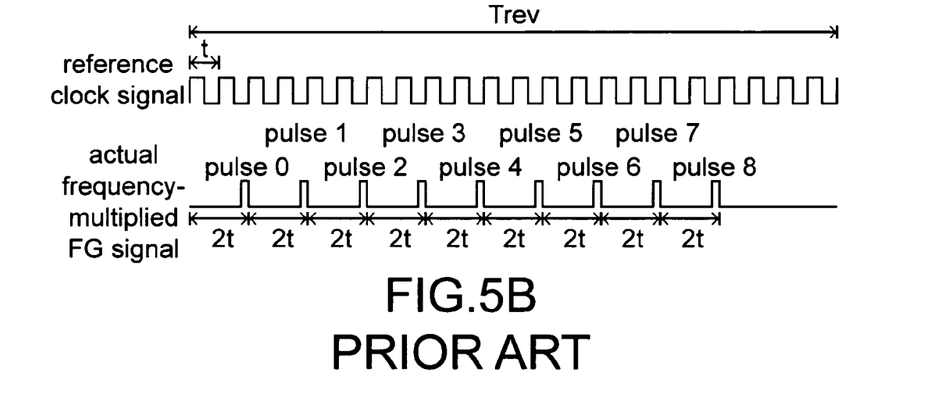
FIG. 5B is a diagram showing a first actual frequency-multiplied FG signal having a frequency-multiplier value equal to 3.
Figure 5C:
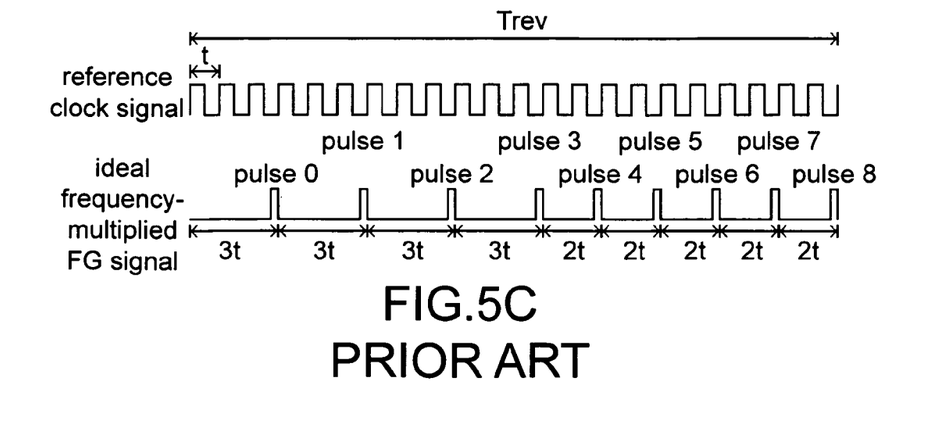
FIG. 5C is a diagram showing a second actual frequency-multiplied FG signal having a frequency-multiplier value equal to 3.

Actually, the period of each single pulse occurred in the frequency-multiplied FG signal is given by the period of the FG signal divided by the frequency-multiplier value. To implement by a digital circuit, it needs a counter to count the reference clock signal to obtain the period of the frequency-multiplied FG signal. For example, assuming a frequency-multiplied FG signal has a frequency-multiplier value equal to 3; the time for the spindle motor 13 rotating one revolution is Trev; and there are 22 clocks occurred in the reference clock signal when the spindle motor 13 rotating one revolution, and the period of each clock is t. Ideally, each of the nine pulses occurred in the frequency-multiplied FG has a period of $$\frac{22}{9}t, \text{ or } 2\frac{4}{9}t,$$

as depicted in FIG. 5A. However, it is hard to generate a signal does not have an integer ratio to the period of the reference clock signal by a digital circuit. Therefore, the conventional frequency-multiplier FG generating circuit may make each pulse have a period 2t by ignoring the remainder, as depicted in FIG. 5B. However, a truncation error is resulted in if the remainder is ignored, and the time for the frequency-multiplied FG signal having nine pulses is less than the Trev, which is a time for the spindle motor 13 to rotate one revolution. Or, the conventional frequency-multiplier FG generating circuit may randomly add the remainder to the nine pulses having an integer period. As depicted in FIG. 5C, the remainder 4 is respectively added to the first four pulses to make each of the first four pulses has a period 3*t* and each of the last five pulses has a period 2*t*. Therefore, the time for the frequency-multiplied FG signal having the nine pulses is the same as the Trev. However, the first four pulses each having a period 3*t* and the last five pulses each having 2*t* also result in another situation that the triggering time points of the pulses occurred in the actual frequency-multiplied FG signal differ from the fixed positions of the optical disc. In some worst cases, the positing error between the triggering time points of the pulses occurred in the actual frequency-multiplied FG signal and the pulses occurred in the ideal frequency-multiplied FG signal is greater than it which is beyond the ability of the optical drive compensating the run-out error efficiently.

Figure 6:
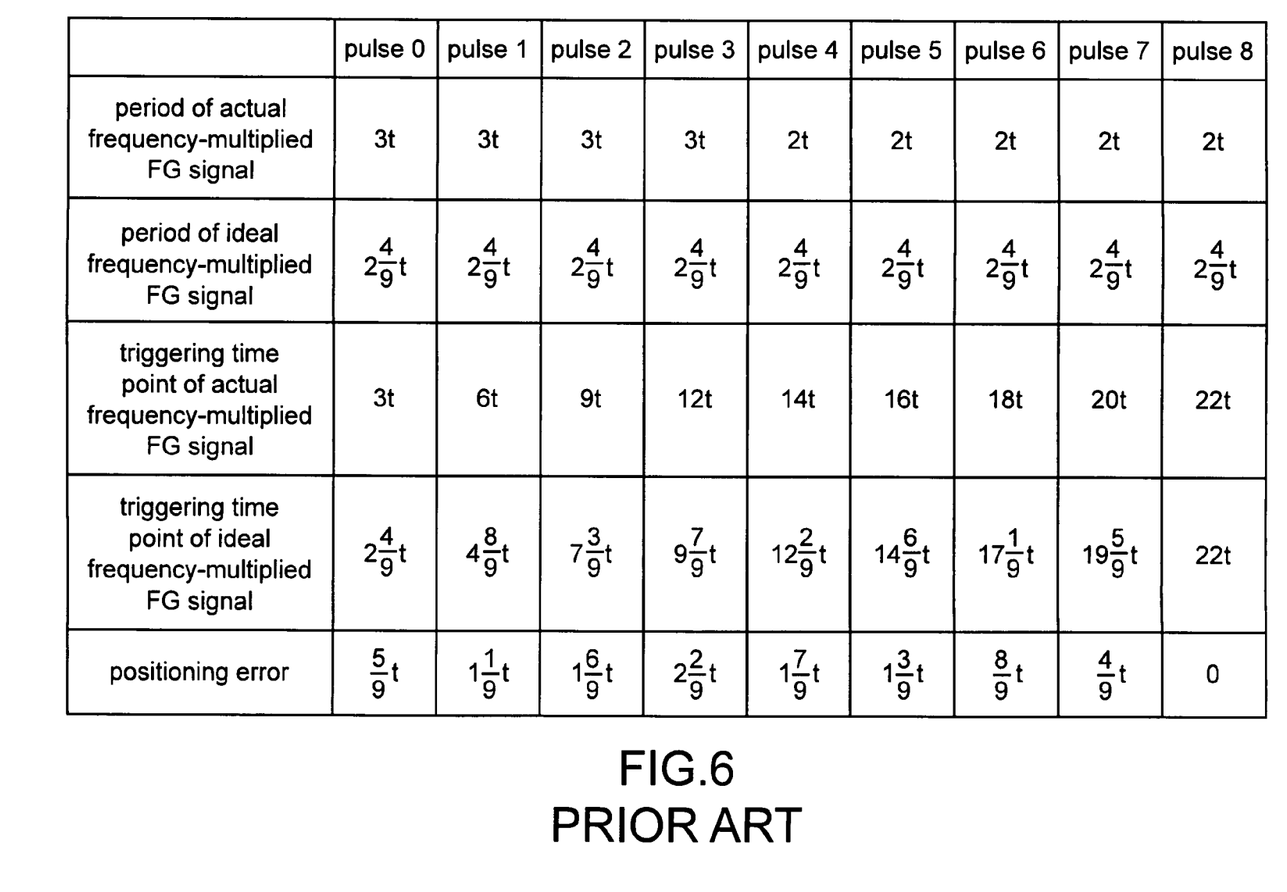
FIG. 6 is a chart showing the relationships between the actual frequency-multiplied FG signal (frequency-multiplier value=3) and the ideal frequency-multiplied FG signal (frequency-multiplier value=3)

FIG. 6 is a chart showing the comparing relationship between the actual frequency-multiplied FG signal (frequency-multiplier value=3) and the ideal frequency-multiplied FG signal (frequency-multiplier value=3). As depicted in FIG. 6, each pulse in the ideal frequency-multiplied FG signal has a period $$\frac{22}{9}t;$$

however, the period of the pulse occurred in the actual frequency-multiplier FG signal is 2*t* or 3*t*. In some cases, the positioning error between the ideal frequency-multiplied FG signal and the actual frequency-multiplied FG signal is worst to $$2\frac{2}{9}t.$$

The worst positioning error also results in a poor performance of the servo control unit 19 compensating the run-out error, and eventually results in a poor track following or a poor servo loop in the optical drive. Moreover, the poor track following or the poor servo loop is getting worst if the frequency-multiplier value is greater than 30.

Because the CAV of an optical drive is getting higher and higher, accordingly the servo control unit 19 needs more fixed positions to preciously control the optical pickup 11 for compensating the run-out error. For example, the blue-ray optical disc has to increase fixed positions to compensate the run-out error, and the positioning error may increase to a couple of clocks if the conventional method is used. Therefore, making the positioning error between the ideal frequency-multiplied FG signal and the actual frequency-multiplied FG signal within a specific range when the optical drive is operated at any CAV is the main purpose of the present invention.

SUMMARY OF THE INVENTION

Therefore, the purpose of the present invention is to provide a method of generating a frequency-multiplied FG signal used in an optical drive. In this way, the positioning error between the ideal frequency-multiplied FG signal and the actual frequency-multiplied FG signal is within a specific range when the optical drive is operated at any CAV.

Therefore, the present invention discloses an optical drive servo control system, comprising: an optical pickup, for accessing an optical disc and generating an optical signal; a spindle motor, for rotating the optical disc and outputting a FG signal and a spindle motor synchronous signal; a frequency-multiplied FG signal generator, for generating an actual frequency-multiplied FG signal after receiving the FG signal, the spindle motor synchronous signal, a reference clock signal, and a frequency-multiplier value; and, a servo control unit, for controlling the spindle motor and the optical pickup, and compensating a run-out error of the optical disc according to the actual frequency-multiplied FG signal; wherein the frequency-multiplied FG signal generator calculates an ideal frequency-multiplied FG signal according to the reference clock signal and the frequency-multiplier value, and a positioning error between the ideal frequency-multiplied FG signal and the actual frequency-multiplied FG signal is less than half of a period of the reference clock signal.

Moreover, the present invention discloses a method for generating a frequency-multiplied FG signal used in an optical drive, operated according to a reference clock signal having a period t, comprising steps of: calculating a number M of clocks of the reference clock signal in one revolution of a spindle motor according to a FG signal and the reference clock signal; calculating a number N of pulses of an actual frequency-multiplied FG signal in one revolution of the spindle motor according to a frequency-multiplier value; obtaining a number (Q+R/N) from an equation M/N, wherein the number Q is a quotient of the equation M/N and the number R is a remainder of the equation M/N; obtaining a number $R_n$ and a number $P_n$ by equations $$R_n = R_{n-1} + R - N \times P_{n-1} \text{ and } P_n \left[ \left| 2 \times \frac{R_n}{N} \right| \right],$$

wherein 0≦n≦N−1 and n is an integer; and assigning a period of the nth pulse in the actual frequency-multiplied FG signal to Qt if (Q+$P_n$)=Q, or assigning the period of the nth pulse in the actual frequency-multiplied FG signal to (Q+1)t if (Q+$P_n$)=(Q+1).

Moreover, the present invention discloses an apparatus for generating an actual frequency-multiplied FG signal used in an optical drive, comprising: a period calculating unit, for calculating a number M of clocks of the reference clock signal in one revolution of a spindle motor according to a FG signal and the reference clock signal, for calculating a number N of pulses of the actual frequency-multiplied FG signal in one revolution of the spindle motor according to a frequency-multiplier value, and for calculating a (Q+R/N) from an equation M/N, wherein the number Q is a quotient of the equation M/N and the number R is a remainder of the equation M/N; a remainder register, for temporarily storing and transferring the number R; a Pn calculating unit, for calculating a number $R_n$ and a number $P_n$ by equations $$R_n = R_{n-1} + R - N \times P_{n-1} \text{ and } P_n \left[ \left| 2 \times \frac{R_n}{N} \right| \right]$$

according to the spindle motor synchronous signal, the actual frequency-multiplied FG signal, the number R, and the number N; wherein 0≦n≦N−1 and n is an integer; and, a pulse generating unit, for assigning a period of the nth pulse in the actual frequency-multiplied FG signal to $(Q+P_n)t$; wherein t is one period of the reference clock signal.

BRIEF DESCRIPTION OF THE DRAWINGS

The present invention can be fully understood from the following detailed description and preferred embodiment with reference to the accompanying drawings in which.

DETAILED DESCRIPTION OF THE PREFERRED EMBODIMENTS

The present invention discloses a method and an apparatus for generating a frequency-multiplied FG signal used in an optical drive. The positioning error between the ideal frequency-multiplied FG signal and the actual frequency-multiplied FG signal is less than a half period of a reference clock signal (t/2) no matter the optical drive is operated at a relatively high CAV or at a relatively low CAV.

Because the triggering time points of the pulses occurred in the actual frequency-multiplied FG signal must be synchronous to the reference clock signal, therefore, the triggering time points of the pulses occurred in the actual frequency-multiplied FG signal will be continuously compared to the triggering time points of the pulses occurred in the ideal frequency-multiplied FG signal in the present invention. Once the positioning error between the ideal frequency-multiplied FG signal and the actual frequency-multiplied FG signal is greater than a half period of the reference clock signal (t/2), the triggering time points of the pulse occurred in the actual frequency-multiplied FG signal will be delayed by one period (t) of the reference clock signal.

For example, assuming a frequency-multiplied FG signal has a frequency-multiplier value equal to 3; the time for the spindle motor 13 rotating one revolution is Trev; and there are 22 clocks occurred in the reference clock signal when the spindle motor 13 rotates one revolution, wherein the period of each clock occurred in the reference clock signal is t. Therefore, there are nine pulses (pulse 0, 1, 2, 3, 4, 5, 6, 7, and 8) occurred in the actual frequency-multiplied FG signal (frequency-multiplier value=3). If the period of the pulse 0 is selected to $2t$, the positioning error between the pulse 0 occurred in the actual frequency-multiplied FG signal and the ideal frequency-multiplied FG signal is $$\frac{4}{9}t,$$

which is less than a half of the period of the reference clock signal (t/2). If the period of the pulse 1 is also selected to $2t$, the positioning error between the pulse 1 occurred in the actual frequency-multiplied FG signal and the ideal frequency-multiplied FG signal is $$\frac{8}{9}t,$$

which is greater than a half period of the reference clock signal (t/2). Therefore, the period of the pulse 1 must be selected to $3t$, and the positioning error between the pulse 1 occurred in the actual frequency-multiplied FG signal and the ideal frequency-multiplied FG signal is reduced to $$\frac{1}{9}t.$$

Figure 7A:
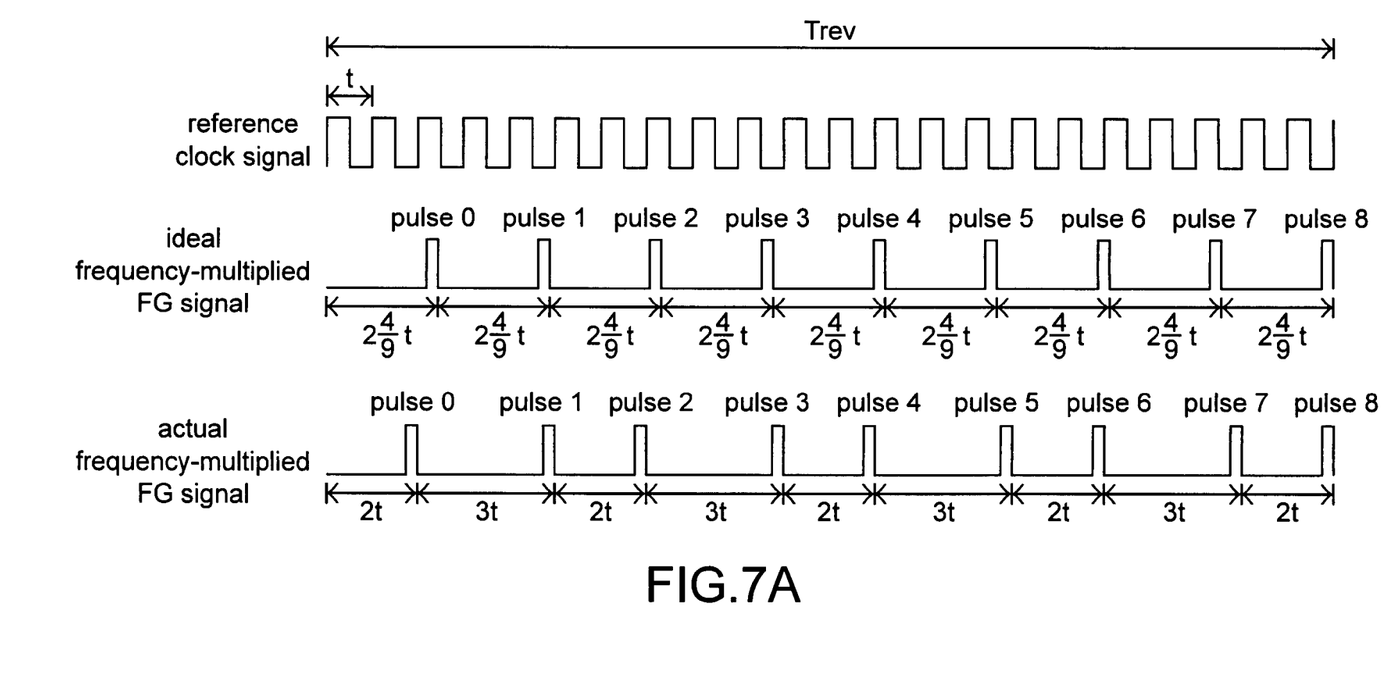
FIG. 7A is a diagram showing the reference clock signal, the ideal frequency-multiplied FG signal, and the actual frequency-multiplied FG signal of the present invention.
Figure 7B:
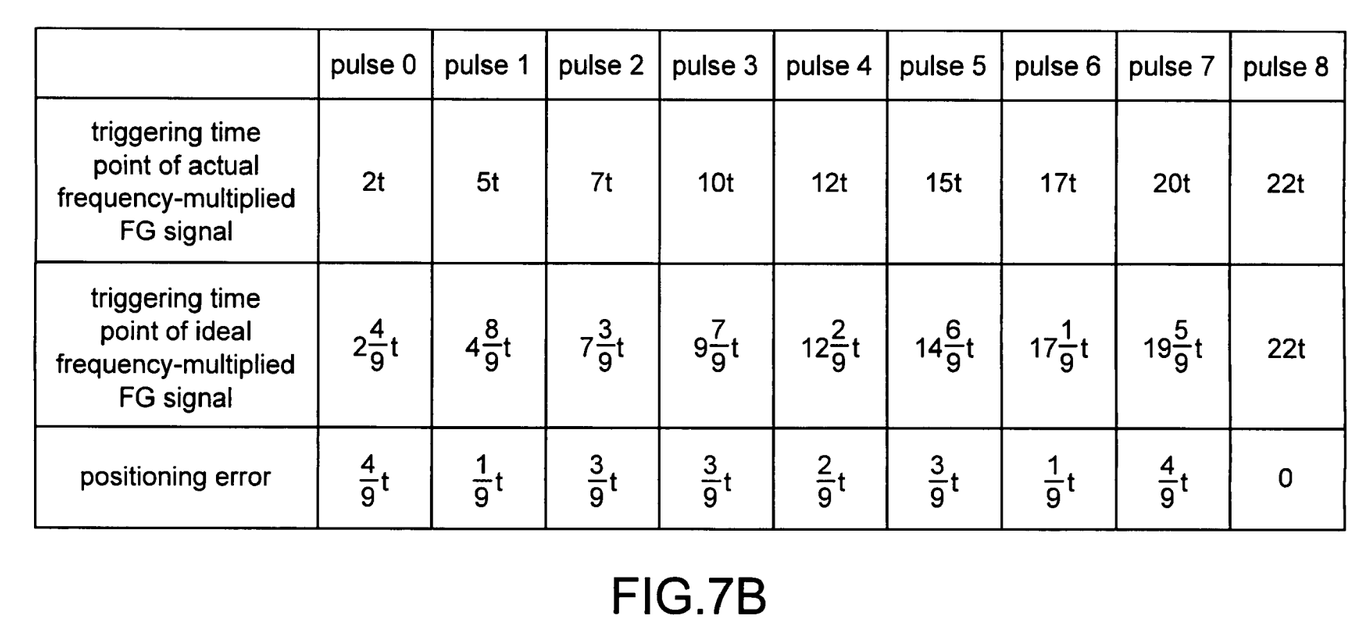
FIG. 7B is a chart showing the positioning error between the ideal frequency-multiplied FG signal and the actual frequency-multiplied FG signal of the present invention.

Accordingly, all the periods of the rest pulses can be calculated by the same sort. FIG. 7A is a diagram showing the reference clock signal, the ideal frequency-multiplied FG signal, and the actual frequency-multiplied FG signal derived from the above-mentioned example. FIG. 7B is a chart showing the positioning error between the ideal frequency-multiplied FG signal and the actual frequency-multiplied FG signal of the present invention. As depicted in FIG. 7B, the positioning error between each pulse occurred in the actual frequency-multiplied FG signal and its corresponding pulse occurred in the ideal frequency-multiplied FG signal is less than a half period of the reference clock (t/2).

To implement the apparatus for generating a frequency-multiplied FG signal, a plurality of equations is introduced in the present invention. Assuming there are N pulses occurred in the frequency-multiplied FG signal when the spindle motor 13 rotates one revolution; and there are M clocks occurred in the reference clock signal when the spindle motor 13 rotates one revolution, wherein the period of each clock is t. Therefore, the period of each pulse occurred in the ideal frequency-multiplied FG signal is $$\frac{M}{N}t = (Q + R/N)t,$$

wherein Q is a quotient of the equation M/N and R is a remainder of the equation M/N. Moreover, $Q+P_n$ stands for the period of the nth pulse, wherein $0 \leq n \leq N-1$, and n is an integer. The $P_n$ is given by the equation $$P_n = \left[\left|2 \times \frac{R_n}{N}\right|\right],$$

wherein [ ] stands for the symbol of Gauss and | | stands for the absolute value. Moreover, the $R_n$ is given by the equation $R_n = R_{n-1} + R - N \times P_{n-1}$, wherein $R_{-1} = 0$ and $P_{-1} = 0$.

A detail step for obtaining the period of each pulse occurred in the actual frequency-multiplied FG signal is explained as below. Assuming the frequency-multiplied FG signal has a frequency-multiplier value equal to 3; the time for the spindle motor 13 rotating one revolution is Trev; and there are 22 clocks occurred in the reference clock signal when the spindle motor 13 rotating one revolution, wherein the period of each clock is t. Therefore, N=9, M=22, Q=2, R=4, and $0 \leq n \leq 8$.

When n=0, $$R_0 = R_{-1} + R - N \times P_{-1} = 0 + 4 - 9 \times 0 = 4,$$
$$P_0 = \left[\left|2 \times \frac{R_0}{N}\right|\right] = \left[\left|2 \times \frac{4}{9}\right|\right] = \left[\frac{8}{9}\right] = 0,$$

therefore, the period of the pulse 0 is $(Q+P_0)t=(2+0)t=2t$.
When n=1, $$R_1 = R_0 + R - N \times P_0 = 4 + 4 - 9 \times 0 = 8,$$
$$P_1 = \left[\left|2 \times \frac{R_1}{N}\right|\right] = \left[\left|2 \times \frac{8}{9}\right|\right] = \left[\frac{16}{9}\right] = 1,$$

therefore, the period of the pulse 1 is $(Q+P_1)t=(2+1)t=3t$.
When n=2, $$R_2 = R_1 + R - N \times P_1 = 8 + 4 - 9 \times 1 = 3,$$
$$P_2 = \left[\left|2 \times \frac{R_2}{N}\right|\right] = \left[\left|2 \times \frac{3}{9}\right|\right] = \left[\frac{6}{9}\right] = 0,$$

therefore, the period of the pulse 2 is $(Q+P_2)t=(2+0)t=2t$.
When n=3, $$R_3 = R_2 + R - N \times P_2 = 3 + 4 - 9 \times 0 = 7,$$
$$P_3 = \left[\left|2 \times \frac{R_3}{N}\right|\right] = \left[\left|2 \times \frac{7}{9}\right|\right] = \left[\frac{14}{9}\right] = 1,$$

therefore, the period of the pulse 3 is $(Q+P_3)t=(2+1)t=3t$.

When n=4, $$R_4 = R_3 + R - N \times P_3 = 7 + 4 - 9 \times 1 = 2,$$
$$P_4 = \left[\left|2 \times \frac{R_4}{N}\right|\right] = \left[\left|2 \times \frac{2}{9}\right|\right] = \left[\frac{4}{9}\right] = 0,$$

therefore, the period of the pulse 4 is $(Q+P_4)t=(2+0)t=2t$.
When n=5, $$R_5 = R_4 + R - N \times P_4 = 2 + 4 - 9 \times 0 = 6,$$
$$P_5 = \left[\left|2 \times \frac{R_5}{N}\right|\right] = \left[\left|2 \times \frac{6}{9}\right|\right] = \left[\frac{12}{9}\right] = 1,$$

therefore, the period of the pulse 5 is $(Q+P_5)t=(2+1)t=3t$.
When n=6, $$R_6 = R_5 + R - N \times P_5 = 6 + 4 - 9 \times 1 = 1,$$
$$P_6 = \left[\left|2 \times \frac{R_6}{N}\right|\right] = \left[\left|2 \times \frac{1}{9}\right|\right] = \left[\frac{2}{9}\right] = 0,$$

therefore, the period of the pulse 6 is $(Q+P_6)t=(2+0)t=2t$.
When n=7, $$R_7 = R_6 + R - N \times P_6 = 1 + 4 - 9 \times 0 = 5,$$
$$P_7 = \left[\left|2 \times \frac{R_7}{N}\right|\right] = \left[\left|2 \times \frac{5}{9}\right|\right] = \left[\frac{10}{9}\right] = 1,$$

therefore, the period of the pulse 7 is $(Q+P_7)t=(2+1)t=3t$.
When n=8, $$R_8 = R_7 + R - N \times P_7 = 5 + 4 - 9 \times 1 = 0,$$
$$P_8 = \left[\left|2 \times \frac{R_8}{N}\right|\right] = \left[\left|2 \times \frac{0}{9}\right|\right] = \left[\frac{0}{9}\right] = 0,$$

therefore, the period of the pulse 8 is $(Q+P_8)t=(2+0)t=2t$.

Figure 8:
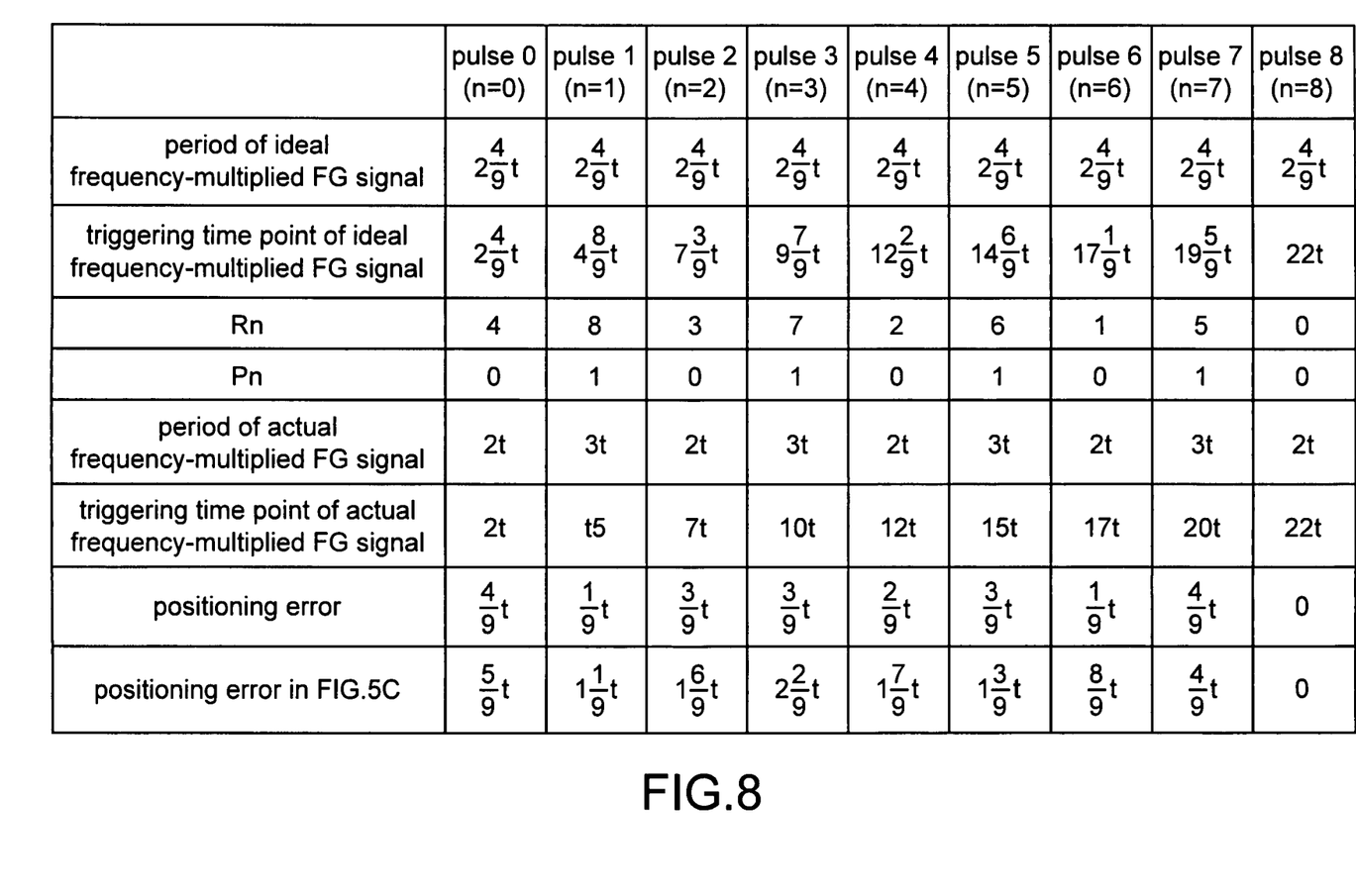
FIG. 8 is a chart showing the relationships between the ideal frequency-multiplied FG signal and the actual frequency-multiplied FG signal.

FIG. 8 is a chart showing the relationship between the ideal frequency-multiplied FG signal and the actual frequency-multiplied FG signal, which is derived from the above-mentioned equations of the present invention. As depicted in FIG. 8, the positioning error between each pulse occurred in the actual frequency-multiplied FG signal and its corresponding pulse occurred in the ideal frequency-multiplied FG signal is less than a half period of the reference clock signal (t/2).

Figure 9:
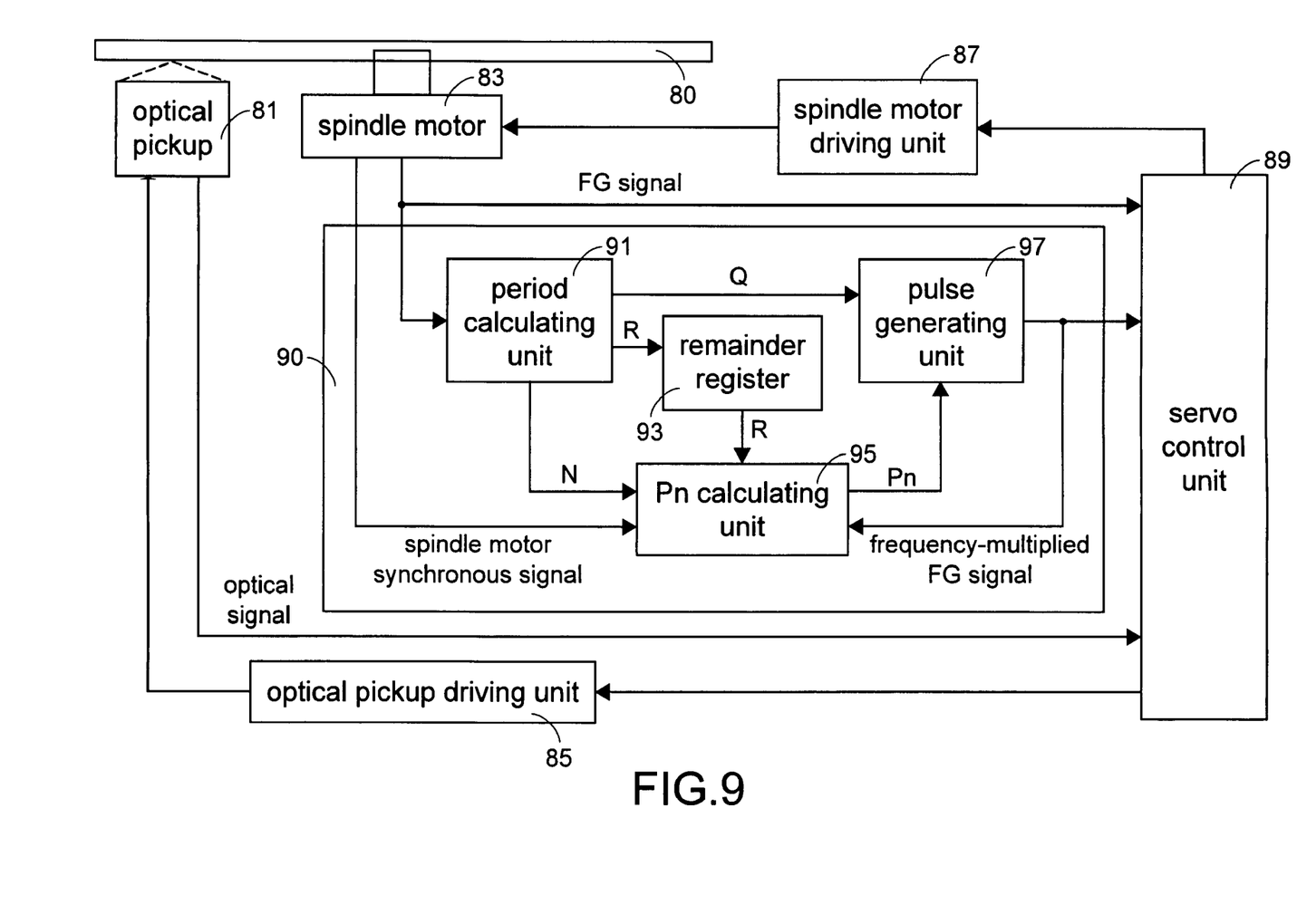
FIG. 9 is a schematic block diagram showing a servo control system which is implemented by the apparatus for generating a frequency-multiplied FG signal of the present invention.

FIG. 9 is a schematic block diagram showing an optical drive servo control system, which is implemented by the apparatus for generating a frequency-multiplied FG signal of the present invention. The optical drive servo control system comprises an optical pickup 81, a spindle motor 83, an optical pickup driving unit 85, a spindle motor driving unit 87, a servo control unit 89, and a frequency-multiplied FG signal generator 90. The frequency-multiplied FG signal generator 90, operated according to a reference clock signal, further comprises a period calculating unit 91, a remainder register 93, a Pn calculating unit 95, and a pulse generating unit 97.

Firstly, according to an optical signal derived from the optical pickup 81, the servo control unit 89 can control the optical pickup 81 to process a focusing, a track jumping, a tracking on, or a track following by using the optical pickup driving unit 85. Moreover, the servo control unit 89 can also control the spindle motor 83 by using the spindle motor driving unit 87. The spindle motor 83 can derive the FG signal to the servo control unit 89 according to the rotating speed of itself. After the FG signal is received by the servo control unit 89, the rotating speed of the spindle motor 83 is detected, and the servo control unit 89 can further control the spindle motor 83 by using the spindle motor driving unit 87. The servo control unit 89 can also receive the frequency-multiplied FG signal for executing the position learning procedure to the optical disc 80, and then compensates the run-out error of the optical disc 80.

In the embodiment of the present invention, the period calculating unit 91 serves to counting M clocks occurred in the reference clock signal according to the FG signal and the reference clock signal when the spindle motor 83 rotates one revolution, wherein the period of each clock is t. Moreover, the period calculating unit 91 also serves to counting N pulses occurred in the frequency-multiplied FG signal according to a frequency-multiplier value when the spindle motor 83 rotates one revolution. (Q+R/N)t is obtained from the equation M/N, wherein Q is a quotient of the equation M/N and R is a remainder of the equation M/N. The period calculating unit 91 then outputs the Q, the R, and the N, wherein the R is temporally stored in the remainder register 93 and then to be transferred to the Pn calculating unit 95.

The Pn calculating unit 95 serves to receive a spindle motor synchronous signal, the frequency-multiplied FG signal, the R, and the N for obtaining a $R_n$ and a $P_n$, wherein the $R_n$ is given by the equation $R_n = R_{n-1} + R - N \times P_{n-1}$, and the $P_n$ is given by the equation $$P_n = \left[\left| 2 \times \frac{R_n}{N} \right|\right].$$

The pulse generating unit 97 serves to receive the Q and the $P_n$, and then generates the frequency-multiplied FG signal according to $(Q+P_n)$ and the reference clock signal, wherein the period of the nth pulse occurred in the frequency-multiplied FG signal is $(Q+1)t$ if $P_n=1$, or the period is Qt if $P_n=0$.

Figure 10:
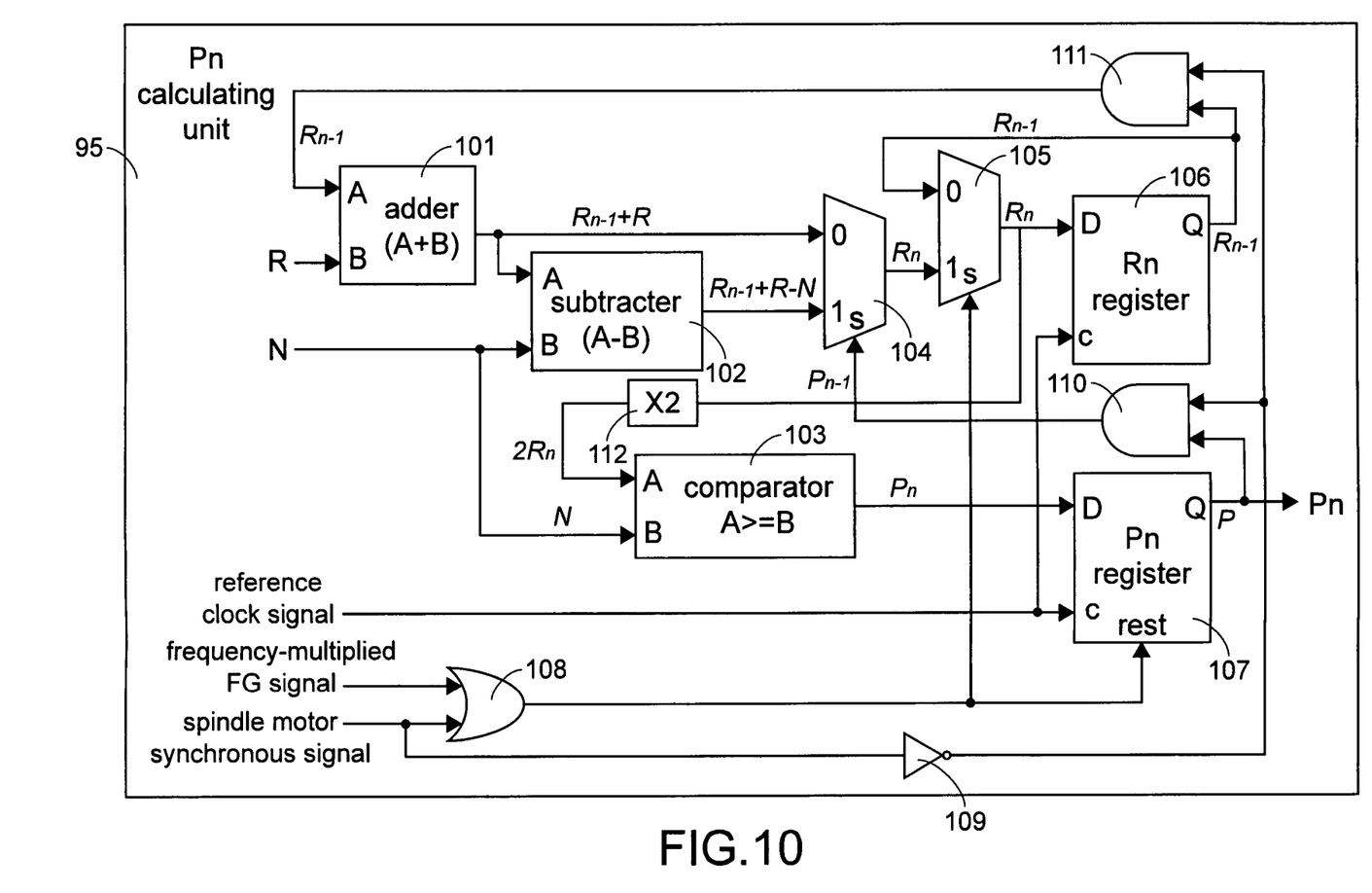
FIG. 10 is a schematic diagram showing the circuit configuration of the Pn calculating unit.

FIG. 10 is a schematic diagram showing the circuit configuration of the Pn calculating unit 95 of the present invention. In the circuit configuration, the adder 101 receives R and $R_{n-1}$, and then outputs $(R+R_{n-1})$; the subtracter 102 receives $(R_{n-1}+R)$ and N, and then outputs the $(R_{n-1}+R-N)$; the first multiplexer 104 serves to assign either $(R_{n-1}+R)$ or $(R_{n-1}+R-N)$ to the $R_n$, according to a selection of the $P_{n-1}$; the second multiplexer 105 serves to update the $R_n$, according to the frequency-multiplied FG signal, and then transfers the $R_n$, to the $R_n$, register 106, in another words, the $R_{n-1}$ is latched in the $R_n$ register 106 before the triggering time point of the nth pulse occurred in the frequency-multiplied FG signal, and the $R_n$ is updated to the $R_n$ register 106 and latched in the $R_n$ register 106 after the triggering time point of the nth pulse occurred in the frequency-multiplied FG signal.

Moreover, the multiplier 112 serves to receive the $R_n$, and then outputs $2R_n$ to the comparator 103; the comparator 103 serves to receive the N and the $2R_n$, and then outputs $P_n$, wherein the $P_n=0$ if the N is greater than the $2R_n$, and $P_n=1$ if the N is equal or less than the $2R_n$; and the $P_n$ register 107 serves to temporarily store and output $P_n$. Furthermore, the frequency-multiplied FG signal and the spindle motor synchronous signal are derived to the OR gate 108; the signal derived from the OR gate 108 serves to reset the $P_n$ register 107 if the pulse occurred in the frequency-multiplied FG signal or in the spindle motor synchronous signal is triggered.

In the embodiment of the present invention, the frequency-multiplied FG signal generator 90 must reset to the initial state for continuously generating the frequency-multiplied FG signal after the spindle motor spins one revolution, therefore, the $P_n$ is resettable through the first AND gate 110 and the NOT gate 109 with the spindle motor synchronous signal; the $R_n$ is resettable through the second AND gate 111 and the NOT gate 109 with the spindle motor synchronous signal.

In the present invention, the period of the pulse occurred in the actual frequency-multiplied FG signal can be dynamically adjusted by the frequency-multiplied FG signal generator 90, so as the positioning error between the actual frequency-multiplied FG signal and the ideal frequency-multiplied FG signal can be tuned within t/2. Because the positioning error is controlled within t/2, the poor track following and the poor servo loop resulted in the prior-art optical drive control system can be improved.

While the invention has been described with reference to the preferred embodiments, the description is not intended to be construed in a limiting sense. It is therefore contemplated that the appended claims will cover any such modifications or embodiments as may fall within the scope of the invention defined by the following claims and their equivalents.

What is claimed is:

1. An optical drive servo control system, comprising:
   an optical pickup, for accessing an optical disc and generating an optical signal;
   a spindle motor, for rotating the optical disc and outputting a frequency generator (FG) signal and a spindle motor synchronous signal;
   a frequency-multiplied FG signal generator, for generating an actual frequency-multiplied FG signal after receiving the FG signal, the spindle motor synchronous signal, a reference clock signal, and a frequency-multiplier value; and
   a servo control unit, for controlling the spindle motor and the optical pickup, and compensating a run-out error from the optical disc according to the actual frequency-multiplied FG signal;
   wherein the frequency-multiplied FG signal generator calculates an ideal frequency-multiplied FG signal according to the reference clock signal and the frequency-multiplier value, and a positioning error between the ideal frequency-multiplied FG signal and the actual frequency-multiplied FG signal is less than half of a period of the reference clock signal.

2. The optical drive servo control system according to claim 1, wherein the frequency-multiplied FG signal generator further comprises:
   a period calculating unit, for calculating a number M of clocks of the reference clock signal in one revolution of a spindle motor according to the FG signal and the reference clock signal, for calculating a number N of pulses of the actual frequency-multiplied FG signal in one revolution of the spindle motor according to the frequency-multiplier value, and for calculating a (Q+R/N) from an equation M/N, wherein the number Q is a quotient of the equation M/N and the number R is a remainder of the equation M/N;
   a remainder register, for temporarily storing and transferring the number R;
   a Pn calculating unit, for calculating a number $R_n$ and a number $P_n$ by equations $$R_n = R_{n-1} + R - N \times P_{n-1} \text{ and } P_n = \left\lfloor \left| 2 \times \frac{R_n}{N} \right| \right\rfloor$$

according to the spindle motor synchronous signal, the actual frequency-multiplied FG signal, the number R, and the number N; wherein $0 \leq n \leq N-1$ and n is an integer; and a pulse generating unit, for assigning a period of the nth pulse in the actual frequency-multiplied FG signal to $(Q+P_n)t$;

wherein t is one period of the reference clock signal.

3. The optical drive servo control system according to claim 2, wherein the Pn calculating unit further comprises:

an adder, for receiving the number R and the number $R_{n-1}$ and outputting a number $(R_{n-1}+R)$;

a subtracter, for receiving the number $(R_{n-1}+R)$ and the number N and outputting a number $(R_{n-1}+R-N)$;

a first multiplexer, for receiving the number $(R_{n-1}+R)$ and the number $(R_{n-1}+R-N)$ and outputting either the number $(R_{n-1}+R)$ or the number $(R_{n-1}+R-N)$ as the number $R_n$ according to the number $P_{n-1}$;

a second multiplexer, for receiving the number $R_n$ and the number $R_{n-1}$ and outputting either the number $R_{n-1}$ or the number $R_n$ as the number $R_n$ according to the actual frequency-multiplied FG signal;

a $R_n$ register coupled to the second multiplexer and the reference clock signal, for receiving the number $R_n$ and updating to the number $R_{n-1}$ by the reference clock signal;

a multiplier, for receiving the number $R_n$ and then outputting a number $2R_n$; and a comparator, for receiving the number N and the number $2R_n$, and then outputting the number $P_n$, wherein the number $P_n$ is equal to 0 if the number N is greater than the number $2R_n$, or the number $P_n$ is equal to 1 if the number N is equal or less than the number $2R_n$.

4. A method for generating a frequency-multiplied frequency generator (FG) signal used in an optical drive, operated according to a reference clock signal having a period t, comprising steps of:

calculating a number M of clocks of the reference clock signal in one revolution of a spindle motor according to a FG signal and the reference clock signal;

calculating a number N of pulses of an actual frequency-multiplied FG signal in one revolution of the spindle motor according to a frequency-multiplier value;

obtaining a number $(Q+R/N)$ from an equation M/N, wherein the number Q is a quotient of the equation M/N and the number R is a remainder of the equation M/N;

obtaining a number $R_n$ and a number $P_n$, by equations $$R_n = R_{n-1} + R - N \times P_{n-1} \text{ and } P_n = \left\lfloor \left| 2 \times \frac{R_n}{N} \right| \right\rfloor,$$

wherein $0 \leq n \leq N-1$ and n is an integer; and assigning a period of the nth pulse in the actual frequency-multiplied FG signal to Qt if $(Q+P_n)=Q$, or assigning the period of the nth pulse in the actual frequency-multiplied FG signal to $(Q+1)t$ if $(Q+P_n)=(Q+1)$.

5. An apparatus for generating an actual frequency-multiplied FG signal used in an optical drive, comprising:

a period calculating unit, for calculating a number M of clocks of the reference clock signal in one revolution of a spindle motor according to a FG signal and the reference clock signal, for calculating a number N of pulses of the actual frequency-multiplied FG signal in one revolution of the spindle motor according to a frequency-multiplier value, and for calculating a $(Q+R/N)$ from an equation M/N, wherein the number Q is a quotient of the equation M/N and the number R is a remainder of the equation M/N;

a remainder register, for temporarily storing and transferring the number R;

a Pn calculating unit, for calculating a number $R_n$ and a number $P_n$ by equations $$R_n = R_{n-1} + R - N \times P_{n-1} \text{ and } P_n = \left\lfloor \left| 2 \times \frac{R_n}{N} \right| \right\rfloor$$

according to the spindle motor synchronous signal, the actual frequency-multiplied FG signal, the number R, and the number N; wherein $0 \leq n \leq N-1$ and n is an integer; and a pulse generating unit, for assigning a period of the nth pulse in the actual frequency-multiplied FG signal to $(Q+P_n)t$;

wherein t is one period of the reference clock signal.

6. The apparatus for generating a frequency-multiplied FG signal used in an optical drive according to claim 5, wherein the Pn calculating unit further comprises:

an adder, for receiving the number R and the number $R_{n-1}$ and outputting a number $(R_{n-1}+R)$;

a subtracter, for receiving the number $(R_{n-1}+R)$ and the number N and outputting a number $(R_{n-1}+R-N)$;

a first multiplexer, for receiving the number $(R_{n-1}+R)$ and the number $(R_{n-1}+R-N)$ and outputting either the number $(R_{n-1}+R)$ or the number $(R_{n-1}+R-N)$ as the number $R_n$ according to the number $P_{n-1}$;

a second multiplexer, for receiving the number $R_n$ and the number $R_{n-1}$ and outputting either the number $R_{n-1}$ and the number $R_n$ as the number $R_n$ according to the actual frequency-multiplied FG signal;

a $R_n$ register coupled to the second multiplexer and the reference clock signal, for receiving the number $R_n$ and updating to the number $R_{n-1}$ by a control of the reference clock signal;

a multiplier, for receiving the number $R_n$ and then outputting a number $2R_n$; and a comparator, for receiving the number N and the number $2R_n$, and then outputting a $P_n$, wherein the $P_n$ is equal to 0 if the number N is greater than the number $2R_n$, or the $P_n$ is equal to 1 if the number N is equal or less than the number $2R_n$.

* * * * *